(12) United States Patent
Parks

(10) Patent No.: US 6,230,955 B1
(45) Date of Patent: May 15, 2001

(54) MULTIPLE CONTOUR COILED TUBING GRIPPER BLOCK

(75) Inventor: Kenneth C. Parks, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 09/270,635

(22) Filed: Mar. 17, 1999

(51) Int. Cl.⁷ .................................................. B65H 29/00
(52) U.S. Cl. ......................... 226/190; 226/173; 166/77.3
(58) Field of Search ................................ 226/173, 171, 226/190; 198/626.6, 690.2, 822; 166/77.3; 254/264, 265; 414/746.7, 745.2

(56) References Cited

U.S. PATENT DOCUMENTS

| | | | |
|---|---|---|---|
| 874,982 | * 12/1907 | Norton . | |
| 1,321,463 | * 10/1919 | Lloyd | 226/171 |
| 1,355,449 | 10/1920 | Campbell . | |
| 2,679,924 | 6/1954 | Powell | 203/227 |
| 2,752,797 | * 7/1956 | Sherwin . | |
| 3,021,939 | * 2/1962 | Hopkins . | |
| 3,108,682 | 10/1963 | Zipper | 198/162 |
| 3,258,110 | 6/1966 | Pilcher | 198/162 |
| 3,285,485 | 11/1966 | Slator | 226/172 |
| 3,559,905 | 2/1971 | Palynchuk | 242/54 |
| 3,606,810 | 9/1971 | Kozij | 83/71 |
| 3,615,154 | 10/1971 | Pryor | 226/173 |
| 3,754,474 | 8/1973 | Palynchuk | 74/162 |
| 3,841,407 | 10/1974 | Bozeman | 166/315 |
| 3,869,038 | 3/1975 | Piper et al. | 198/165 |
| 3,945,547 | 3/1976 | Ledebur | 226/172 |
| 4,064,987 | 12/1977 | Rowan | 198/604 |
| 4,171,738 | * 10/1979 | Lieberman | 198/803.9 |
| 4,515,220 | 5/1985 | Sizer et al. | 166/384 |
| 4,585,061 | 4/1986 | Lyons, Jr. et al. | 166/77 |
| 4,624,726 | 11/1986 | Harper, Jr. | 156/323 |
| 4,655,291 | 4/1987 | Cox | 166/385 |
| 4,787,505 | 11/1988 | Tweedy | 198/803.01 |
| 5,094,340 | 3/1992 | Avakov | 198/626.1 |
| 5,279,364 | 1/1994 | Jantzen et al. | 166/77 |
| 5,309,990 | 5/1994 | Jantzen et al. | 166/77 |
| 5,326,010 | 7/1994 | Moras | 226/172 |
| 5,853,118 | 12/1998 | Avakov | 226/173 |

FOREIGN PATENT DOCUMENTS

| | | |
|---|---|---|
| 992114 | 6/1976 | (CA) . |
| 1175307 | * 5/1961 | (DE) . |
| 1122762 | 9/1956 | (FR) . |
| 2 325 948 | 12/1998 | (GB) . |

* cited by examiner

Primary Examiner—Donald P. Walsh
Assistant Examiner—Collin A. Webb
(74) Attorney, Agent, or Firm—Robert A. Kent; Anthony L. Rahhal (57) ABSTRACT

A gripper block for use in grippingly engaging coiled tubing, pipe, rod, cable or like objects having various outside dimensions is provided. The gripper block has a gripping portion which includes a curved and a planar gripping surface. The planar gripping surface preferably includes a pair of opposed sloped planar gripping surfaces to engage coiled tubing, preferably steel coiled tubing of varying diameters. The sloped gripping surfaces preferably provide a V-shaped engagement configuration. The curved gripping surface is adapted to engage coiled tubing, preferably composite coiled tubing having a diameter less than the coiled tubing to be engaged by the sloped gripping surfaces.

26 Claims, 8 Drawing Sheets

MULTIPLE CONTOUR COILED TUBING GRIPPER BLOCK

BACKGROUND OF THE INVENTION

This invention relates to coiled tubing injection equipment used in the oil and gas industry and more particularly to gripper blocks used in coiled tubing injectors. As is well known in the art, coiled tubing injectors are typically used to move coiled tubing into and out of oil and gas wellbores.

Reeled or coiled tubing has been run into wells for many years for performing certain downhole operations, including but not limited to completions, washing, circulating, production, production enhancement, cementing, inspecting and logging. There are a number of patents issued on coiled tubing injectors and related equipment. Such injectors typically use a pair of opposed endless gripper chains mounted in a common plane. The gripper chains are normally made up of links, rollers and gripper blocks. Opposed gripper blocks on the endless chains opposingly engage the tubing so as to firmly grasp the tubing in such a way that the gripper blocks will force the tubing into or out of a wellbore when the gripper chains are driven. On setting the gripper chains into motion and upon each opposing pair of gripper blocks releasing their hold on the tubing, another pair of opposed gripper blocks grippingly engage the tubing and the cycle continues until a desired amount of tubing has been inserted or withdrawn from the wellbore, or until the gripper chains are no longer driven.

A variety of gripper blocks have been developed to improve the performance of coiled tubing injector units. Such improvements include designs directed to increasing the load carrying capability of the gripper block, eliminating or limiting scarring and distortion of the tubing caused by gripper block engagement, providing the ability to accommodate differing tubing diameters without having to change gripper blocks, reducing the weight of gripper blocks and reducing the manufacturing costs of gripper blocks. Such prior art gripper blocks are disclosed in U.S. Pat. No. 5,094,340 to Avakov, issued Mar. 10, 1992, and U.S. Pat. No. 5,853,118 to Avakov issued Dec. 29, 1998, both assigned to the assignee of the present invention, the details of both of which are incorporated herein by reference.

Figure 1:
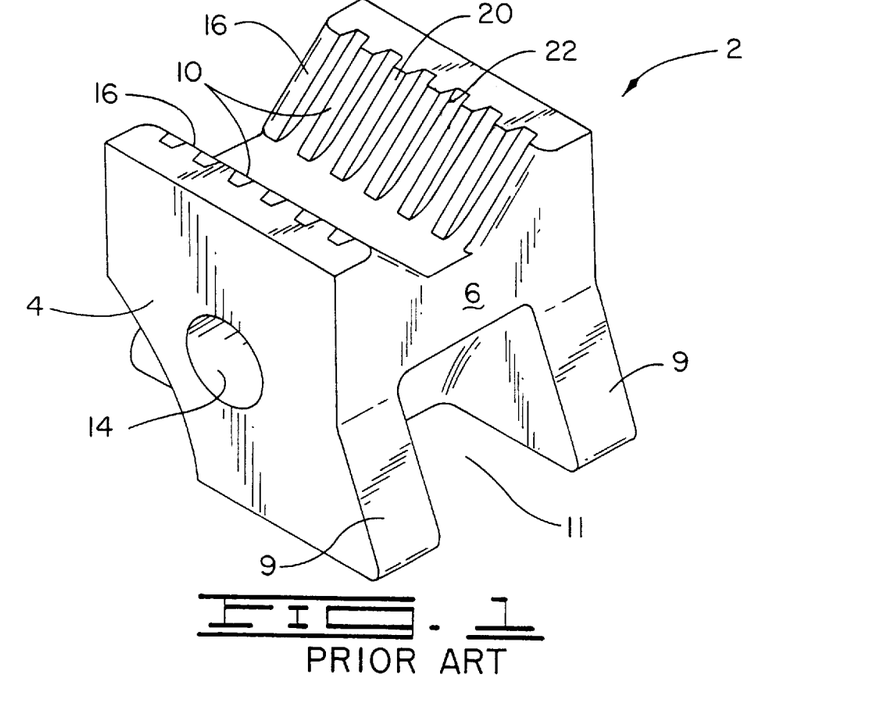
FIG. 1 is a perspective view of a prior art gripper block having sloped planar gripping surfaces.
Figure 2:
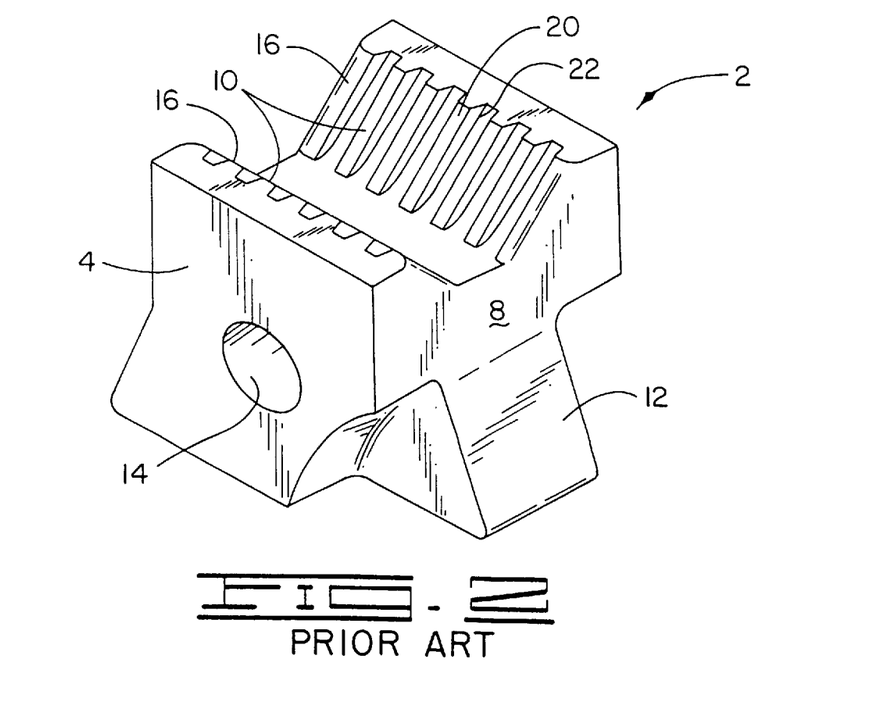
FIG. 2 is a perspective view of the prior art gripper block taken in the opposite direction of FIG. 1.

The gripper blocks described in the aforementioned patents have great utility in that they will accommodate different tubing diameters without having to change gripper blocks. As depicted in FIG. 1, a prior art gripper block 2 has opposite sides 4, opposite ends 6 and 8 positioned along an imaginary longitudinal axis, and a gripping region 10 running parallel to the longitudinal axis for gripping a section of continuous tubing, tube or other article that is to be injected or withdrawn, or otherwise have a force imparted thereon. End 8 has a wedge-shaped tongue 12 extending therefrom. End 6 has ears 9 extending therefrom defining recessed region 11 therebetween. A single borehole, or pin hole 14 extends through the gripper block body 2.

Tubing gripping region 10 located on the upper portion of block 2 includes a pair of angled or sloped gripping surfaces 16 which diverge away from a base area to form a generally V-shaped profile when viewed from either end of block 2. Surfaces 16 and 18 comprise alternating ridges and grooves 20 and 22, respectively, configured to resemble acme-type threads.

The prior art gripper block described in FIG. 1 can be effectively utilized to move tubing or other elongated objects of various diameters in and out of a wellbore and has enjoyed commercial success. Typically, the coiled tubing utilized with such prior art gripper blocks is a steel coiled tubing which can be utilized to perform a wide variety of operations in a wellbore. However, it has been found that using such gripper blocks to move composite coiled tubing is not as efficient as desired, since the sloped planar surfaces in the gripping region often cause damage to composite coiled tubing.

Composite coiled tubing is lighter than steel coiled tubing and is easier to force into wells that deviate from the vertical, including horizontal wells. Thus, there are times when it is preferable to use a composite coiled tubing to perform a desired operation, and other times when it may be preferable to use a steel coiled tubing. Although the prior art gripper blocks described herein work adequately with steel coiled tubing, they are not effective for use with composite coiled tubing. If it is desired to perform an operation with composite coiled tubing, a different gripper block must be used. The injector unit must therefore be disassembled, and gripper blocks compatible with composite tubing must be installed. If it is later desired to utilize steel coiled tubing, the composite compatible gripper blocks must be replaced with blocks designed to move steel coiled tubing.

Thus there is a need for a gripper block which has a gripping surface that is capable of accommodating varying sizes of coiled tubing and that is also capable of accommodating different material types such as steel and composite coiled tubing.

SUMMARY OF THE INVENTION

The present invention is directed toward an improved gripper block for use in grippingly engaging coiled tubing, pipe, rod, cable or like objects having various outside diameters. Specifically, the present invention is directed toward an improved gripper block for use in grippingly engaging both composite coiled tubing and steel coiled tubing. The improved gripper block has a gripping region defined thereon which may comprise first and second gripping portions.

The first gripping portion comprises a pair of sloped planar gripping surfaces. The second gripping portion comprises a curved gripping surface. The sloped planar gripping surfaces are preferably sloped at an angle of approximately 90° from each other. The sloped gripping surfaces comprise a plurality of ridges having grooves therebetween. The curved gripping surface likewise has ridges and grooves defined thereon. Preferably, the ridges and grooves on the curved gripping surface are tapered such that at a center of the curved gripping surface, no groove or ridge exists. The curved gripping surface, and preferably the ridges thereon have a first radius of curvature. The grooves are defined by a second radius of curvature. The sloped planar gripping surfaces diverge outwardly from outer ends of the curved gripping surface.

The curved gripping surface will engage a tubing having a first diameter in such a way as to move the tubing in and out of a wellbore. The curved gripping surface is uniquely adapted to engage composite coiled tubing and to move the composite coiled tubing without damaging the tubing. Preferably, the tubing engaged by the curved gripping surface has a radius slightly smaller than or substantially identical to the first radius of curvature of the curved gripping surface.

The sloped planar gripping surfaces will engage tubing of various diameters greater than the diameter of the tubing engaged by the curved gripping surface. Thus, the sloped planar gripping surfaces will engage tubing having a diameter falling in the range from a second diameter to a third diameter wherein the third diameter is greater than the second diameter and the second diameter is greater than the diameter of the tubing engaged by the curved gripping surface.

BRIEF DESCRIPTION OF THE DRAWINGS

FIG. 9 is a perspective view of a multitude of the gripper blocks of the present invention installed between a segment of a pair of gripper chains.

DESCRIPTION OF THE PREFERRED EMBODIMENTS

Figure 3:
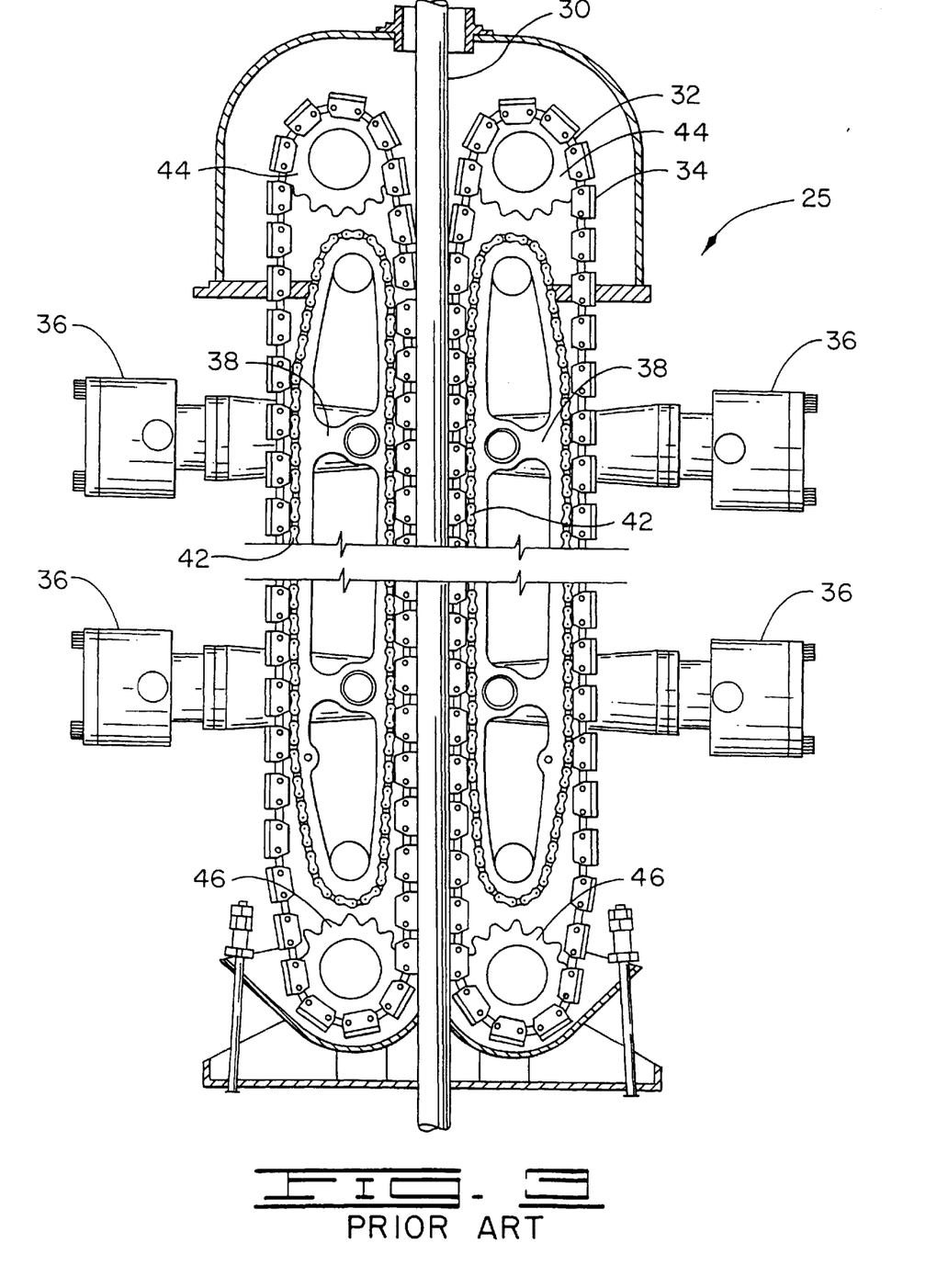
FIG. 3 is a schematic view showing a coiled tubing injector with a portion of a coiled tubing gripped between the drive chains thereof.

Referring now to the drawings and specifically to FIG. 3, a coiled tubing injector 25 is shown schematically. Coiled tubing injector 25 is shown gripping a coiled tubing 30. Coiled tubing injector 25 includes a pair of endless drive chains 32 each carrying a multiplicity of gripper blocks 34. Gripper blocks 34 are urged inwardly by hydraulic cylinders 36 which bias opposed pressure beams 38 inwardly. A roller chain 42 is interposed between pressure beams 38 and drive chains 32. Drive chains 32 may be acutated by sprockets 44 which may be powered by any means known in the art, such as reversible hydraulic motors (not shown). Idler sprockets 46 are provided to take up slack in chains 32. It is readily seen that numerous pairs of opposed gripper blocks 34 along pressure beams 38 are in contact with and engage coiled tubing 30 at any one moment. Upon withdrawing and/or injecting tubing from the wellbore, and upon each opposing pair of gripper blocks releasing their hold on the tubing, another pair of opposing gripper blocks will grippingly engage the tubing.

Figure 4:
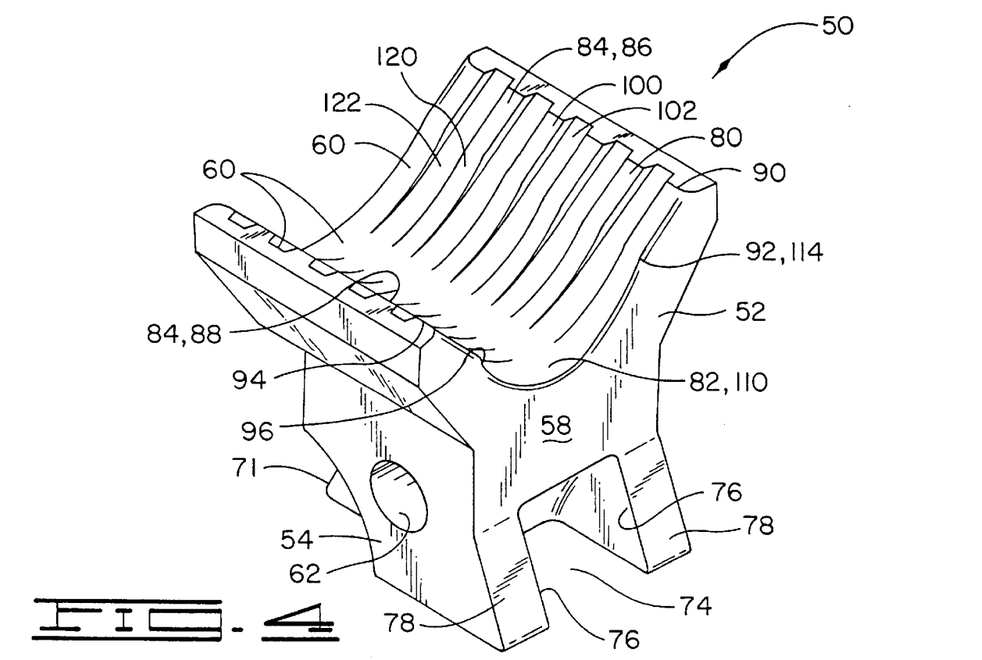
FIG. 4 is a perspective view of the gripper block of the present invention having the ear portions thereof in view.
Figure 5:
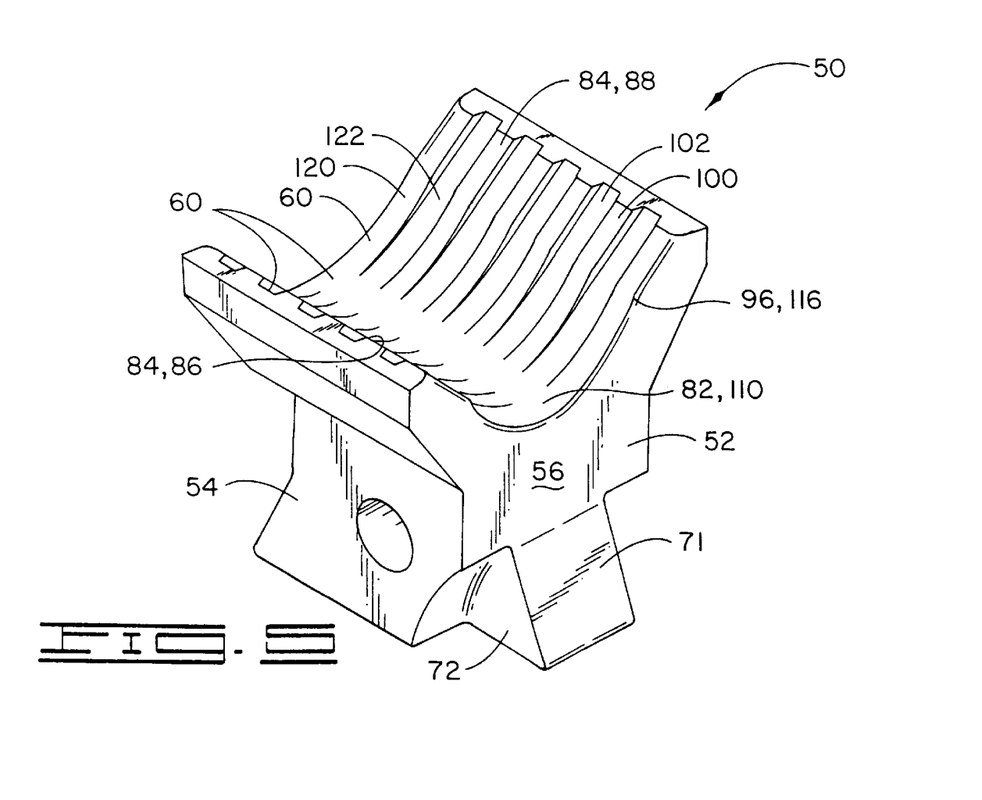
FIG. 5 is a perspective view of the gripper block of the present invention taken in the opposite direction of FIG. 4 and having the tongue portion in view.
Figure 6:
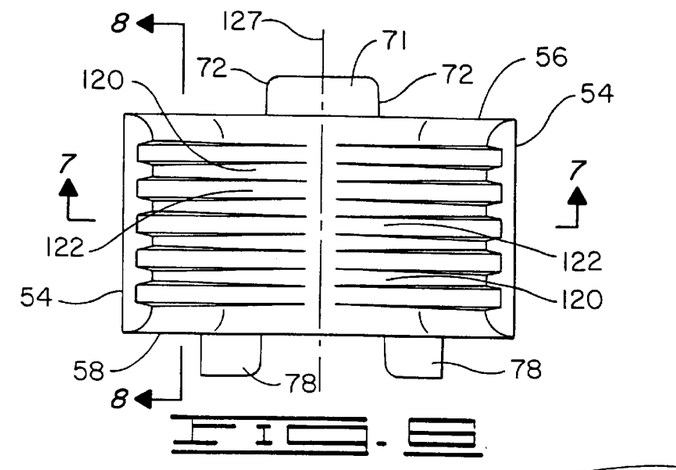
FIG. 6 is a top view of the gripper block of the present invention.

Referring now to FIGS. 4 and 5, a gripper block 50 of the present invention is shown. Gripper block 50 comprises a block body 52 having opposite sides 54, first and second ends 56 and 58, respectively, and a gripping portion or region 60. Opposite ends 56 and 58 are positioned along an imaginary longitudinal axis. Gripping portion 60 extends longitudinally between ends 56 and 58, and is parallel to the longitudinal axis.

Figures 7, 8:
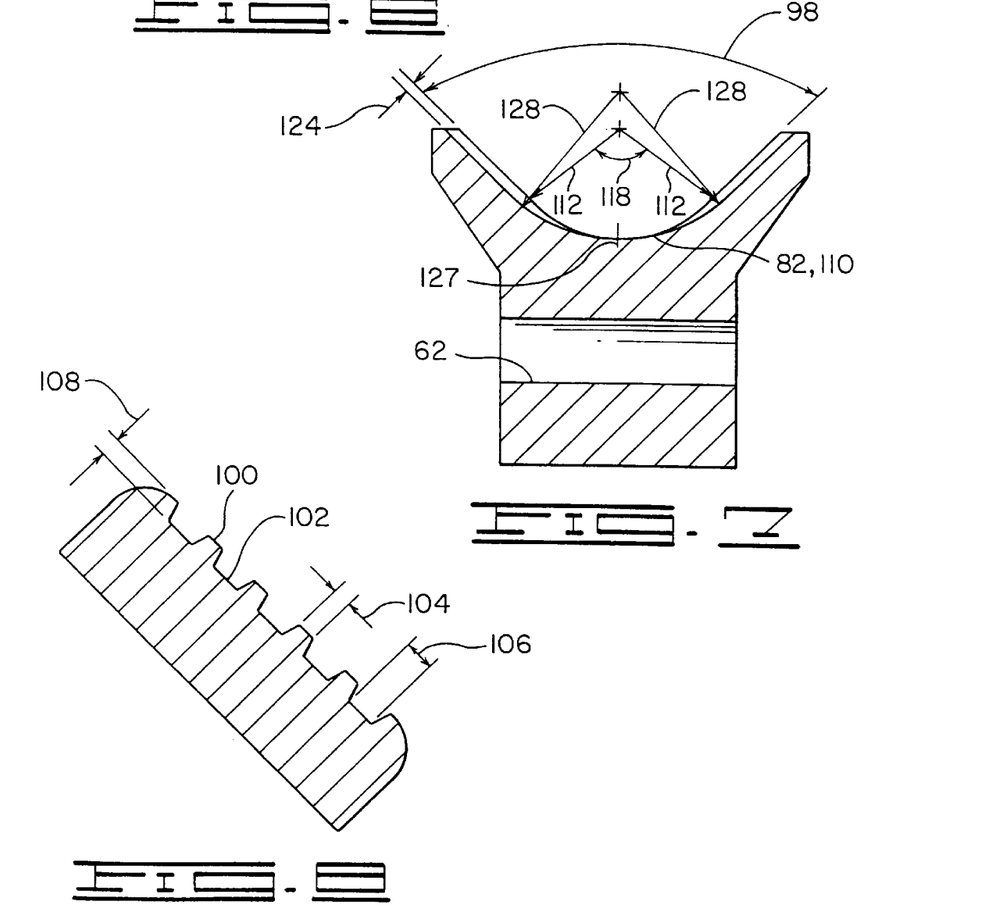
FIG. 7 is a view taken from line 7—7 of FIG. 6.
FIG. 8 is a section view showing the ridges and grooves of a sloped portion of the gripper block.

A borehole or pin hole 62 is defined through block body 52 and extends between opposed sides 54. Referring now to FIGS. 8 and 9, borehole 62 is preferably sized and configured to receive a pin 64 which is used to secure a first inner chain plate 66 to a first outer chain plate 68 to form a chain 70. As shown in FIGS. 8 and 9, chains 70 may be attached on both sides 54 of block body 52. A single pin 64 may extend completely through the block body and both chains 70 or, if desired, separate pins which extend only part way into pin hole 62 may be used on each side of gripper block 50.

Figure 10:
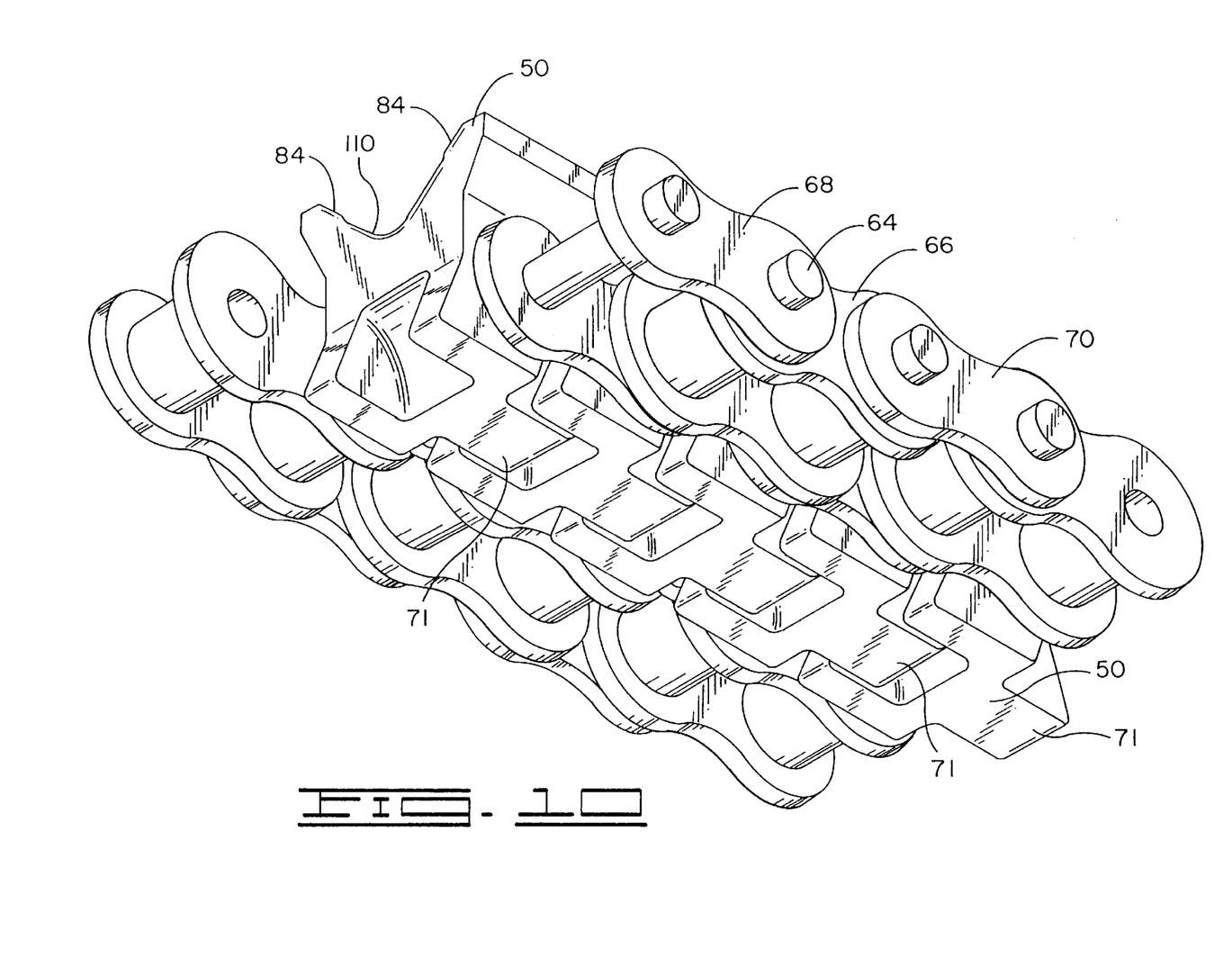
FIG. 10 is a perspective view of the multitude of gripper blocks and gripper chains of FIG. 8 taken from below.

As is known in the art, such a chain typically may include roller bushings to separate the two sets of chain plates and to facilitate motion and reduce wear between a gear that drives or guides the chain within the injector apparatus. A gripper block and chain assembly as shown in FIGS. 9 and 10 may be utilized in a coiled tubing injector such as that schematically illustrated in FIG. 3 in place of the chain 32 and gripper block 34 arrangement, or in other tubing injectors known in the art.

Referring now to FIGS. 4 and 5, end 56 has a wedge-shaped tongue 71 extending therefrom. Tongue 71 has sides 72 and is configured and dimensioned to be accommodated without interference with a slotted or recessed region 74 which is defined by inner sides 76 of a pair of ears 78 which extend outwardly from end 58 of block body 52.

Gripping portion 60 is located on and extends longitudinally along the upper portion of gripper block 50 as oriented in FIGS. 3 and 4. Gripping portion 60 may be chamfered or rounded near ends 56 and 58 so as to prevent a scarring or damage to the tubing or other elongated object being engaged and moved by gripper blocks 50. Gripping portion 60 may comprise a first gripping portion 80 and a second gripping portion 82.

First gripping portion 80 comprises a pair of opposed sloped planar gripping surfaces 84 which may comprise surfaces 86 and 88, respectively. Planar surface 86 has a first, or outer end 90 and a second, or inner end 92. Sloped planar surface 88 has a first, or outer end 94 and a second, or inner end 96. Planar surfaces 86 and 88 converge from first ends 90 and 94 thereof to second ends 92 and 96 thereof. Thus, sloped surfaces 86 and 88 are angled with respect to each other and diverge from the second ends to the first ends thereof to form a generally V-shaped profile when viewed from either end of block 50. Preferably, the surfaces are sloped to form an included angle 98 of less than 120° and more preferably to form an included angle of approximately 90°.

Preferably, the planar gripping surfaces comprise alternating ridges 100 and grooves 102. Grooves 102 provide space for receiving grease, paraffin, mud, etc., which may be clinging to the exterior of tubular objects that are to be gripped by the gripper blocks. Ridges 100 and grooves 102 are preferably configured to resemble acme-type threads. In addition to providing space for receiving debris clinging to the outer surface of the tubing, the alternating ridge and groove arrangement provides enhanced gripping for tubular objects. Widths 104 and 106 of ridges 100 and grooves 102 along with the depth 108 of grooves 102, which is the same as the height of the ridges, may vary to suit particular needs. However, ridge widths ranging from 0.117 inch to 0.125 inch and groove widths ranging from 0.200 inch to 0.220 inch and groove depths ranging from 0.120 inch to 0.160 inch have proven to be readily adaptable to work pieces having a variety of outside diameters while providing for the escape of materials which may be clinging to the exterior of the tubing or other elongated object.

Second gripping portion 82 may comprise a curved gripping surface 110. Curved gripping surface 110 has a radius of curvature 112 and extends longitudinally between ends 56 and 58 of block 50. Curved surface 110 has a first outer end 114 and a second outer end 116. Radius of curvature 112 preferably extends between ends 114 and 116 through an angle 118. Angle 118 is less than 180° and more preferably is between 90° and 150°. As is apparent from FIGS. 4 and 5, first end 114 is coincident with second end 92 of sloped surface 86 and second end 116 is coincident with second end 96 of sloped surface 88. Thus, sloped gripping surfaces 86 and 88 diverge from ends 114 and 116 of curved gripping surface 110.

Curved gripping surface 110 preferably comprises a plurality of ridges 120 and grooves 122. Preferably, grooves 122 are tapered from a maximum depth 124, which is preferably equal to the depth 108 of grooves 102 to a minimum height 126 at a center 127 of gripping surface 110.

Preferably, ridges 120 are defined by radius of curvature 112, referred to as a first radius of curvature, and grooves 122 are defined by a second radius of curvature 128 which is greater than first radius of curvature 112. Preferably, radii 112 and 128 intersect at only the center 127 of curved gripping surface 110. Thus, the height 126 of ridge 170 at the center 127 of curved gripping surface 110 is zero. Ridges 120 will therefore taper from maximum height 124 to a generally smooth surface at the center 127 of the curved gripping surface 110.

Figure 11:
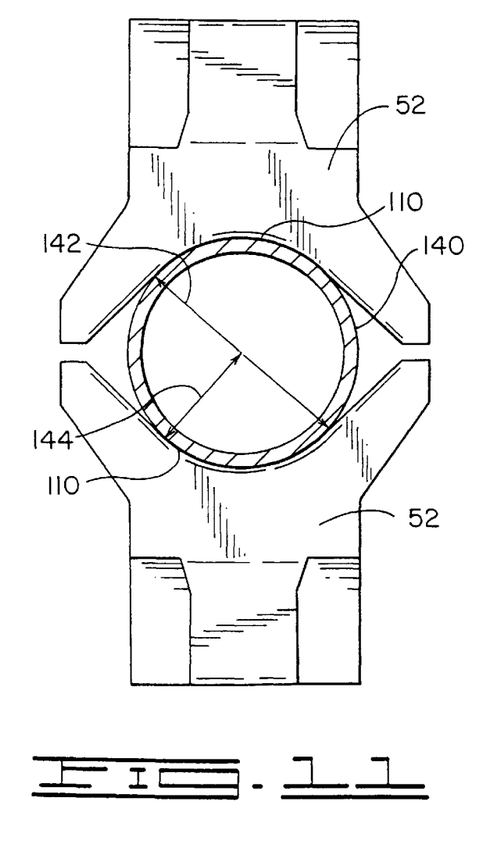
FIG. 11 is an end view showing the curved gripping surface of the gripper blocks of the present invention engaging a coiled tubing.
Figure 12:
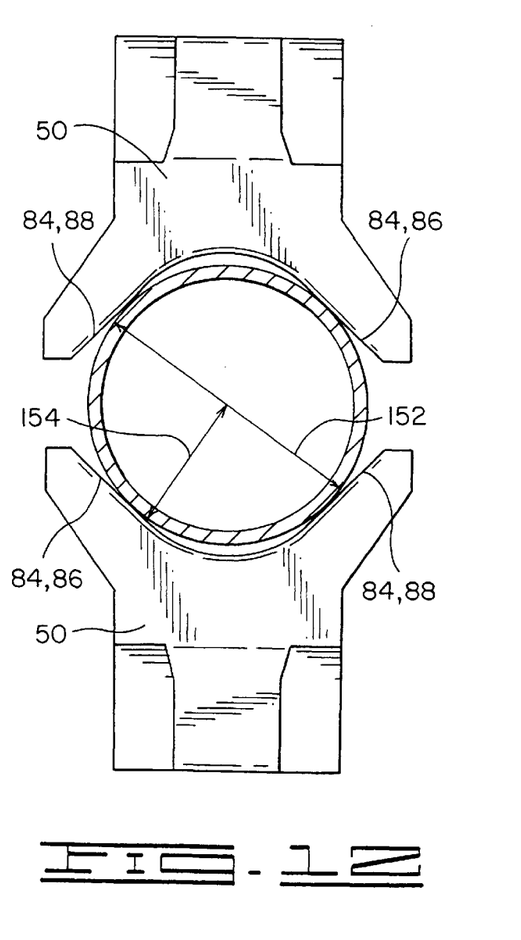
FIGS. 12 and 13 are end views showing the sloped planar gripping surfaces on the blocks of the present invention engaging coiled tubing of different diameters.
Figure 13:
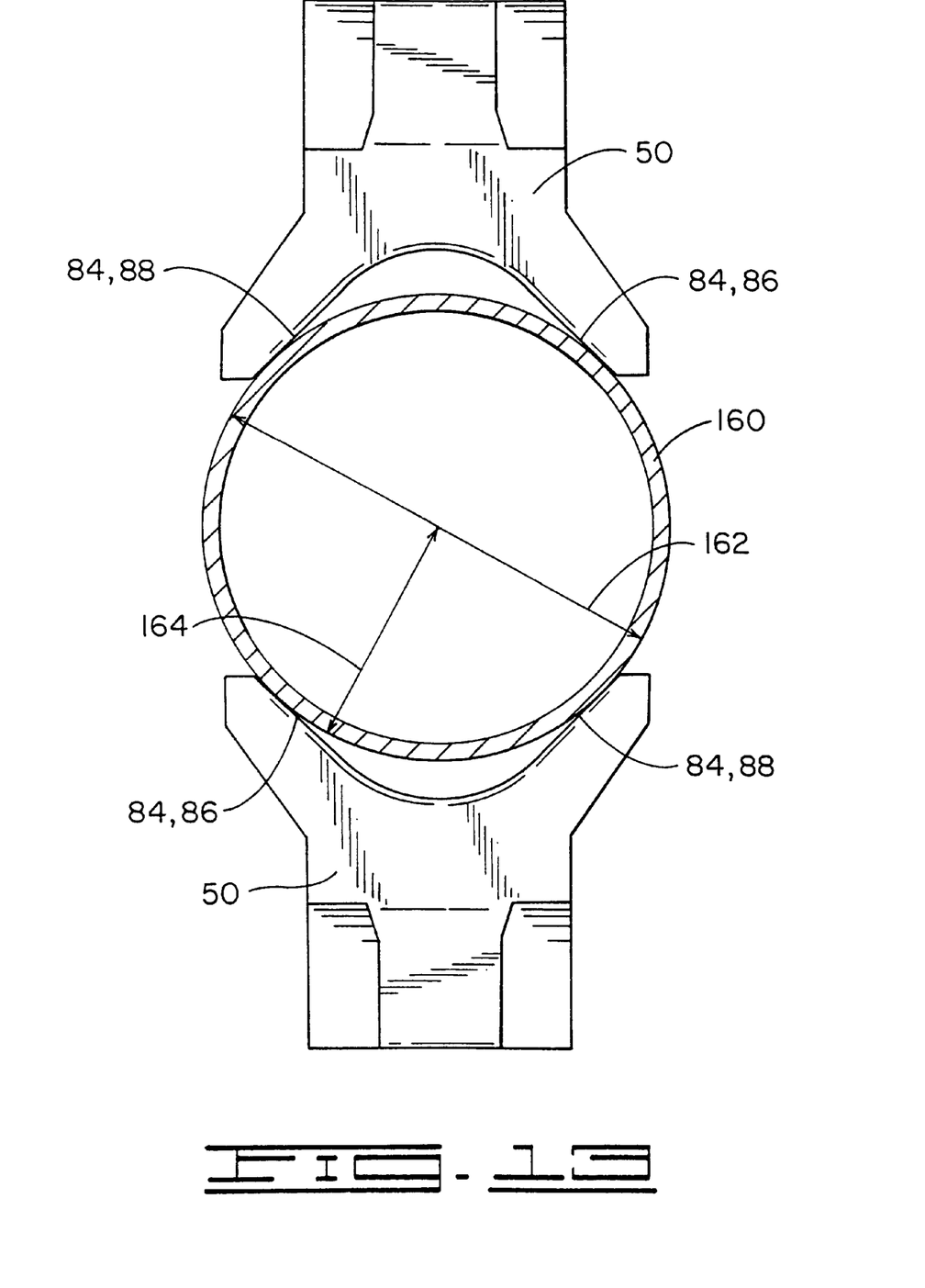

Referring now to FIGS. 11–13, it is apparent that the gripper blocks of the present invention are uniquely adapted to move tubing or other elongated objects of various diameters and materials. FIG. 11 shows an elongated object, which may be a coiled tubing 140 engaged by opposed gripper blocks 50. Tubing 140 has a first diameter 142 and a corresponding first radius 144. Tubing 140 is engaged by curved gripping surface 110 such that when gripper blocks 50 are utilized in an injector apparatus, gripper blocks 50 will apply sufficient forces to tubing 140 to move the tubing in and out of a wellbore. Radius 144 may be slightly less than, but is preferably approximately equal to first radius of curvature 112. Although tubing 140 may comprise steel or composite coiled tubing, composite coiled tubing is the preferred material to be engaged by curved gripping surface 110.

Referring now to FIGS. 12 and 13, opposed gripper blocks 50 are shown engaging tubings 150 and 160. Tubing 150 has a second diameter 152 and a corresponding second radius 154. Tubing 160 has a third diameter 162 and a corresponding third radius 164. As is apparent from the drawings third diameter 162 is greater than second diameter 152, and second diameter 152 is greater than diameter 142. Gripper blocks 50 are thus adapted to engage tubing with diameters ranging from first diameter 142 to third diameter 162 and to move such tubing in and out of a wellbore when gripper blocks 50 are utilized in an injector apparatus. Sloped surfaces 86 and 88 are uniquely configured to engage and move steel coiled tubing having a diameter of any magnitude falling in the range from the magnitudes of second diameter 152 to third diameter 162, without damaging or distorting the tubing. Likewise, curved gripping surface 110 is uniquely adapted to engage and move composite coiled tubing 140 in and out of a wellbore without damaging or distorting the tubing.

Thus, the gripper blocks of the present invention may be used to move coiled tubing of varying diameters and differing material in and out of a wellbore without the need for changing gripper blocks, which saves both time and money. For example, a tubing injector utilizing the gripper blocks of the present invention may be used to lower a composite coiled tubing having a diameter 142 into a wellbore. Any desired wellbore operation may be performed utilizing the composite coiled tubing and, when desired, the composite coiled tubing may be removed from the wellbore. The composite coiled tubing may be removed from the injector apparatus and a steel coiled tubing having a diameter in the range from second diameter 152 to third diameter 162 may be inserted therethrough and engaged by gripper blocks 50. The injector apparatus can then be utilized to lower the steel coiled tubing into the wellbore where the desired operation can be performed. The steel tubing can then be removed from the wellbore and the process repeated and another operation performed with the composite coiled tubing. It is irrelevant whether steel or composite is inserted first since one advantage of the gripper blocks of the present invention is that they can be utilized to insert and withdraw both steel and composite coiled tubing.

The particular dimensions of the gripper block of the present invention can vary as desired so that the blocks will properly engage tubing of predetermined, or preselected first, second and third diameters 142, 152 and 162. Thus, by way of example only, a gripper block 50 having a radius of curvature 112 of 1.4375 inches which extends through an angle of approximately 110° will engage and move a coiled tubing, preferably a composite coiled tubing having a diameter of approximately 2.875 inches with curved gripping surface 110. Steel coiled tubing having diameters ranging from 3.5 to 5.0 inches will be engaged and moved with such a gripping block by gripping surfaces 86 and 88 having an included angle of approximately 90°. The foregoing example is not intended to be limiting but is simply provided to show the wide ranges of tubing which can be carried by the gripper block of the present invention.

The gripper block of the present invention provides a distinct advantage over prior art gripper blocks in that it provides a curved gripping surface to engage and carry composite coiled tubing and also provides sloped planar gripping surfaces to engage and move steel coiled tubing. No prior art gripper blocks are capable of adequately carrying both composite and varying sizes of steel coiled tubing. Thus, the gripper block of the present invention saves time and money since it is not necessary to remove or replace gripper blocks in a tubing injector when it is desired to perform a downhole operation with a tubing of a different size or material.

It has been shown that the improved gripper block of the present invention fulfills all of the objects set forth hereinabove and provides distinct advantages over the known prior art. It is understood by those skilled in the art that the foregoing description of the invention and the illustrative drawings which accompany the same are presented by way of explanation only and that modifications to the improved gripper blocks as claimed may be made without departing from the spirit and scope of the disclosed invention.

What is claimed is:

1. A gripper block for use in a gripper chain in a device for moving elongated objects, the gripper block comprising:
   a block body adapted to be connected to said gripper chain, said block body having a gripping portion for engaging said elongated objects, said gripping portion comprising:
   a curved gripping surface for engaging and moving said elongated objects in and out of a well; and
   pair of sloped planar gripping surfaces for engaging and moving said elongated objects in and out of said well;
   wherein said curved surface will grippingly engage and move elongated objects having a first outer diameter, and wherein said sloped planar surfaces will grippingly engage and move elongated objects having diameters greater than said first diameter.

2. The gripper block of claim 1, said curved portion having outer ends, wherein said sloped surfaces diverge from said outer ends of said curved gripping surface.

3. The gripper block of claim 2, wherein said sloped planar surfaces are sloped at an angle of not greater than 120° from each other.

4. The gripper block of claim 3, wherein said sloped planar surfaces are sloped at an angle of approximately 90° from each other.

5. The gripper block of claim 1, wherein said sloped planar gripping surfaces comprise a plurality of ridges with grooves therebetween, wherein said ridges engage said elongated objects.

6. The gripper block of claim 1, wherein said curved gripping surface will grippingly engage a composite coiled tubing to move said composite coiled tubing without damaging said tubing.

7. The gripper block of claim 1, said gripper block having a hole therethrough to receive a pin to attach said gripper block to said chain.

8. A gripper block for use in an injector apparatus for moving tubing in and out of a wellbore, said gripper block comprising:
   a block body, said body being connectable to a gripper chain in said injector apparatus;
   said block body defining an arcuate gripping surface for engaging a tubing having a first outer diameter, wherein said arcuate gripping surface will engage said tubing with said first outer diameter to move said tubing in and out of said well; and
   a pair of planar gripping surfaces for engaging tubing having a diameter in a range from a second diameter to a third diameter, said second and third diameters having a magnitude greater than said first diameter, wherein said planar gripping surfaces will engage said tubing having a diameter in said range from said second to said third diameter to move said tubing in and out of said wellbore.

9. The gripper block of claim 8, wherein a radius of curvature of said curved gripping surface is substantially identical to a radius of said tubing having said first diameter.

10. The gripper block of claim 8 wherein a radius of curvature of said curved gripping surface extends from a first to a second end through an angle of not greater than 150°.

11. The gripper block of claim 10 wherein said angle is approximately 110°.

12. The gripper block of claim 8, wherein said planar gripping surfaces are sloped and diverge from said curved gripping surface to define an included angle of approximately 90°.

13. A gripper block for use in a gripper chain in a device for moving elongated objects, the gripper block comprising:
   a block body adapted to be connected to said gripper chain, said block body having a gripping portion for engaging said elongated objects, said gripping portion comprising:
      a curved gripping surface for engaging said elongated objects, said curved gripping surface comprising a plurality of ridges having grooves therebetween; and
      a pair of sloped planar gripping surfaces for engaging said elongated objects;
   wherein said curved surface will grippingly engage elongated objects having up to a first outer diameter, and wherein said sloped planar surfaces will grippingly engage elongated objects having a diameter greater than said first diameter.

14. The gripper block of claim 13, said ridges on said curved gripping surface having a first radius of curvature and said grooves having a second radius of curvature.

15. The gripper block of claim 14, said centers of said first and second radii of curvature being spaced so that said first and second radii of curvature intersect.

16. The gripper block of claim 13, wherein a height of said ridges in said curved gripping surface decreases from a maximum height at an outer end of said curved gripping surface toward a plane of symmetry of said curved gripping surface.

17. The gripper block of claim 13, wherein said curved gripping surface will grippingly engage a composite coiled tubing to move said composite coiled tubing without damaging said tubing.

18. The gripper block of claim 13, said block body having a pin hole defined therethrough for receiving a pin to secure said gripper block to said chain.

19. The gripper block of claim 13, said gripper block having two pin holes for receiving pins to secure said gripper block to said chain.

20. A gripper block for use in an injector apparatus for moving tubing in and out of a wellbore, said gripper block comprising:
   a block body, said body being connectable to a gripper chain in said injector apparatus;
   said block body defining an arcuate gripping surface for engaging a tubing having a first outer diameter, wherein said arcuate gripping surface has grooves defined therein and wherein said arcuate gripping surface will engage said tubing with said first outer diameter to move said tubing in and out of said wellbore; and
   a pair of planar gripping surfaces for engaging tubing having a diameter in a range from a second diameter to a third diameter, said second and third diameters having a magnitude greater than said first diameter, wherein said planar gripping surfaces will engage said tubing having a diameter in said range from said second to said third diameter to move said tubing in and out of said wellbore.

21. The gripper block of claim 20, wherein said grooves are tapered.

22. The gripper block of claim 20, wherein a radius of curvature of said curved gripping surface extends from a first to a second end through an angle of not greater than 150°.

23. A gripper block for use in a gripper chain in a device for moving in and out of a well, the gripper block comprising:
   a block body adapted to be connected to said gripper chain, the block body having a gripping portion comprising:
      a curved gripping surface for engaging said elongated objects, said curved gripping surface having outer ends; and
      a pair of flat gripping surfaces for engaging said elongated objects wherein said flat gripping surfaces diverge from said outer ends of said curved gripping surface, and wherein the flat gripping surfaces are adapted to engage elongated objects having an outer diameter greater than the outer diameter of the elongated objects that can be gripped by said curved gripping surface.

24. The gripper block of claim 23 wherein said curved gripping surface comprises a plurality of ridges having grooves therebetween.

25. The gripper block of claim 23 wherein said block has at least one pin hole therethrough for receiving a pin to connect said gripper block to said gripper chain.

26. The gripper block of claim 23, wherein said flat gripping surfaces comprise ridges having grooves therebetween.

\* \* \* \* \*